United States Patent [19]
Hara et al.

[11] Patent Number: 5,090,005
[45] Date of Patent: Feb. 18, 1992

[54] TAPE RECORDER WITH MEANS FOR SAMPLING AND HOLDING FOCUSING AND TRACKING ERROR SIGNALS DURING DISCONTINUITY OF TAPE ON SURFACE OF ROTATING DRUM

[75] Inventors: Fumio Hara, Kodaira; Seiichi Mita, Kanagawa; Morishi Izumita, Inagi; Hiroyuki Tsuchinaga, Kokubunji, all of Japan

[73] Assignee: Hitachi, Ltd., Tokyo, Japan

[21] Appl. No.: 428,937

[22] Filed: Oct. 30, 1989

[30] Foreign Application Priority Data

Oct. 31, 1988 [JP] Japan .................. 63-272969

[51] Int. Cl.⁵ .................................................. G11B 7/00
[52] U.S. Cl. ................................. 369/97; 360/77.04; 360/77.12
[58] Field of Search ............... 369/44.17, 44.18, 44.14, 369/44.29, 44.32, 44.35, 97, 44.34; 360/77.01, 77.04, 77.12, 77.13, 70

[56] References Cited

U.S. PATENT DOCUMENTS

| | | | |
|---|---|---|---|
| 4,872,152 | 10/1989 | Tsuyoshi et al. | 369/124 |
| 4,884,260 | 11/1989 | Bouldin et al. | 369/97 X |
| 4,970,707 | 11/1990 | Hara et al. | 369/44.17 X |

*Primary Examiner*—Robert L. Richardson
*Attorney, Agent, or Firm*—Antonelli, Terry, Stout & Kraus

[57] ABSTRACT

A tape recorder of the present invention comprises a pair of feed and take-up spools for winding a tape as recording media, a rotatable drum rotated to wind and run the tape between the pair of spools over the drum surface helically, a head for recording, reproducing or erasing signals on the tape wound over said drum surface, and control means for controlling the relative positional relationship between the head and the tape wound over the drum surface based on an error signal such that said signals are stably recorded, reproduced or erased along a desired track, the control means having means for holding the error signal during the period in which the tape is discontinued over a drum surface. The value of the error signal at the time immediately before the tape disappears from the drum surface, or the value of the error signal at the time immediately after the tape reappears over the drum surface during the preceding rotation of the drum is used as the error signal to be held, thereby allowing to stably restart the positioning control when the tape reappears over the drum surface.

20 Claims, 7 Drawing Sheets

FIG. 3A
IN CASE OF LARGE DIAGONAL ANGLE

FIG. 3B
IN CASE OF SMALL DIAGONAL ANGLE

FIG. 4A
FRONT VIEW

FIG. 4B
SIDE SECTIONAL VIEW

FIG. 8A
CONTROLLER

FIG. 8B
TIMING CHART

FIG. 9A
CONTROLLER

FIG. 9B
TIMING CHART

TAPE RECORDER WITH MEANS FOR SAMPLING AND HOLDING FOCUSING AND TRACKING ERROR SIGNALS DURING DISCONTINUITY OF TAPE ON SURFACE OF ROTATING DRUM

BACKGROUND OF THE INVENTION

The present invention relates to a tape recorder for helically recording, reproducing or erasing signals on a tape in a magnetic or optical manner.

In order to record signals on a tape helically, there have generally been used tape recorders, such as home video tape recorders (VTRs) using magnetic recording media, in which a magnetic head built into a drum is rotated at a high speed and a tape is helically moved over the drum at a lower speed. Meanwhile, in tape recorders for recording, reproducing or erasing signals on optical recording media by the use of a laser beam condensed to fine spot, if an optical head is built into a drum, the centrifugal force produced upon rotation of the optical head at a high speed would adversely affect an actuator of the optical head, and the recorder structure would be increased in size. For such reasons, as disclosed in Japanese Patent Publication No. 63-869, there has been proposed a tape recorder in which tape feed and take-up spools are arranged one above the other and a tape is helically moved round a drum with an optical head fixed outside the drum for recording, reproducing or erasing signals.

In any of the conventional tape recorders as mentioned above, while the tape is helically wound round the drum, it is not wound throughout tee outer periphery of the drum, leaving some region where the tape is not present.

Figure 11:
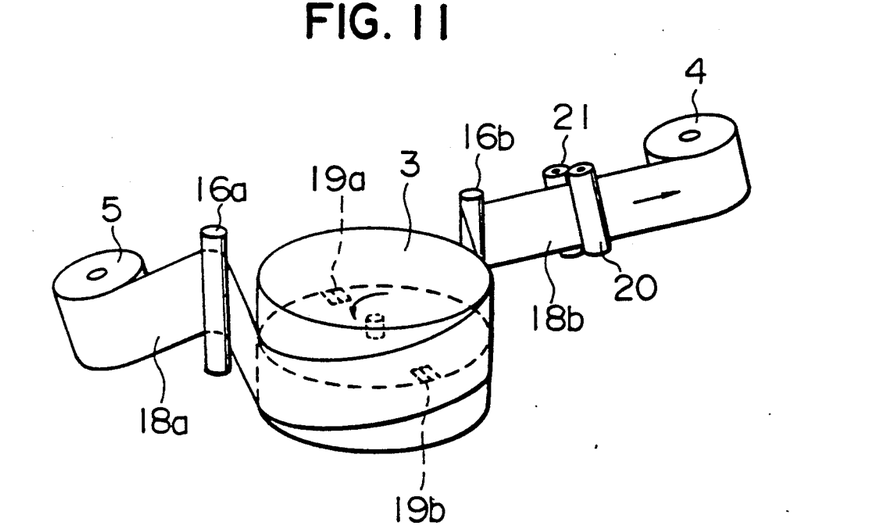
FIG. 11 is a perspective view of a conventional magnetic video tap recorder.

When recording or reproducing signals on a tape with high density, a head is required to accurately follow a signal track. In video tape recorders using magnetic recording media, as shown in FIG. 11, because a magnetic head has a wide width and a tape is held substantially in contact with the magnetic head for recording, reproducing or erasing, the recorder has been operated stably regardless of the partial absence of the tape from a drum. In an attempt of achieving higher-density recording in future use, however, it is required to accurately track a target signal track (called tracking). In this case, if the target track is partially disappeared, signals could not be recorded, reproduced or erased in a stable manner.

Meanwhile, in the case of tape recorders using optical recording media, if the tape is partially absent from the drum, focusing servo and tracking servo of the optical head becomes unstable, and this also makes it impossible to record, reproduce or erase signals in a stable manner.

Further, where the tape feed and take-up spools are arranged one above the other in the drum, the level of the tape edge differs at least a tape width between inlet and outlet points of the tape with respect to the drum. Therefore, the signal track to be obtained by the head disposed inside or outside the drum and scanning the tape helically wound round the drum cannot be formed throughout the outer periphery of the drum. Accordingly, when tracking the target signal track, the signal track is necessarily disappeared over a larger region than that where the tape is not present, also making it impossible to record, reproduce or erase signals in a stable manner.

In addition, the inventors have previously proposed an optical tape recorder as disclosed in U.S. Pat. Ser. No. 239,389 (filing date; Sept. 1, 1988,now U.S. Pat. No. 4,970,707). The proposed optical tape recorder has a guide plate disposed between a rotating drum and a tape for keeping stability of tape running, to thereby restrain fluctuations while the tape is running. Also, automatic focusing with high rigidity endurable to large centrifugal force caused by high-speed rotation is carried out using automatic focusing by utilizing the technology to vary the focus position of a laser beam with changes in the wavelength of a diode laser, or automatic focusing due to an actuator made of a piezoelectric element. Further, an additional head is provided separately from an optical head for recording or reproducing information, so that positional information to detect a running speed of the tape is recorded on the tape with certain intervals. That positional information is employed to record track guide information at the target locations precisely. Based on signals of the track guide information, the optical head for recording or reproducing the information can record signals and addresses of the information at the target locations precisely.

In the above prior art, however, no considerations are paid to the fact that the tape is not present over the drum in some region, and hence the head cannot be stably positioned on the signal track. This caused a problem in a control system for positioning the head.

SUMMARY OF THE INVENTION

It is an object of the present invention to stably position a head on a target signal track even in the case where a tape is not present over a drum in some region.

To achieve the above object, so-called sampled servo technology is utilized in the present invention. The head is positioned on a target signal track, and actual positioning control is stopped through switching operation in an electric circuit, when the head comes to a region where the tape is not present over a drum. Simultaneously, so-called sample holding to hold the sampled value of a signal is effected such that an error signal for imaginary positioning control is given by the value of the error signal sampled at the location immediately before disappearance of the tape, or the value of the error signal sampled at the location where the tape reappears during the preceding rotation of the drum. The positioning control is thereby restarted stably at the time when the tape reappears over the drum.

Since the error signal is not actually detected during the positioning control based on sample holding, there occurs no adverse effect in a positioning system even if the tape disappears from the outer periphery of the drum and the error signal is increased.

By making small a diagonal angle of the tape helically wound round the drum to form the signal almost throughout the outer periphery of the drum, the region where the signal track disappears becomes substantially equal to the region where the tape is not present over the drum, permitting to carry out stable tracking.

If the period of time in which the tape disappears from the outer periphery of the drum is short, the positioning control of the head on the target signal track is restarted stably when the tape appears again over the drum, because the head positioned on the target signal track by sample holding remains positioned on the imaginary signal track with inertial force even during the period time in which the tape is not present over the drum. Recording, reproducing or erasing of signals is thereby stably performed on the target signal track.

Further, with small fluctuations during rotation of the drum, when the signal track is disappeared and then appeared again, it is assumed that the reappeared signal track takes substantially the same position as that of the signal track having been formed during the preceding rotation of the drum. Therefore, by employing the positioning error signal obtained during the preceding rotation of the drum as the current error signal when the signal track reappears, the head can be positioned substantially on the reappeared signal track.

A diagonal angle of the tape over the drum can be adjusted at the time of winding the tape round the drum. Thus, the diagonal angle can be made small with proper arrangement of capstans and tape guides, and so forth, thereby permitting to narrow the region where the signal track disappears over the drum.

DESCRIPTION OF THE PREFERRED EMBODIMENTS

Hereinafter, the present invention will be described in detail by referring to preferred embodiments thereof. It is to be noted that an optical tape recorder using optical recording media will be described in the following embodiments of the present invention, but the present invention is also applicable to other tape recorders such as VTRs using magnetic recording media and memory devices without departing from the essence of the present invention.

Further, although the embodiments will be explained as employing phase change optical recording media as optical recording media, this is not intended to limit the type of media and any other various types of optical recording media can also be used in the present invention without departing from the essence thereof.

Figure 1:
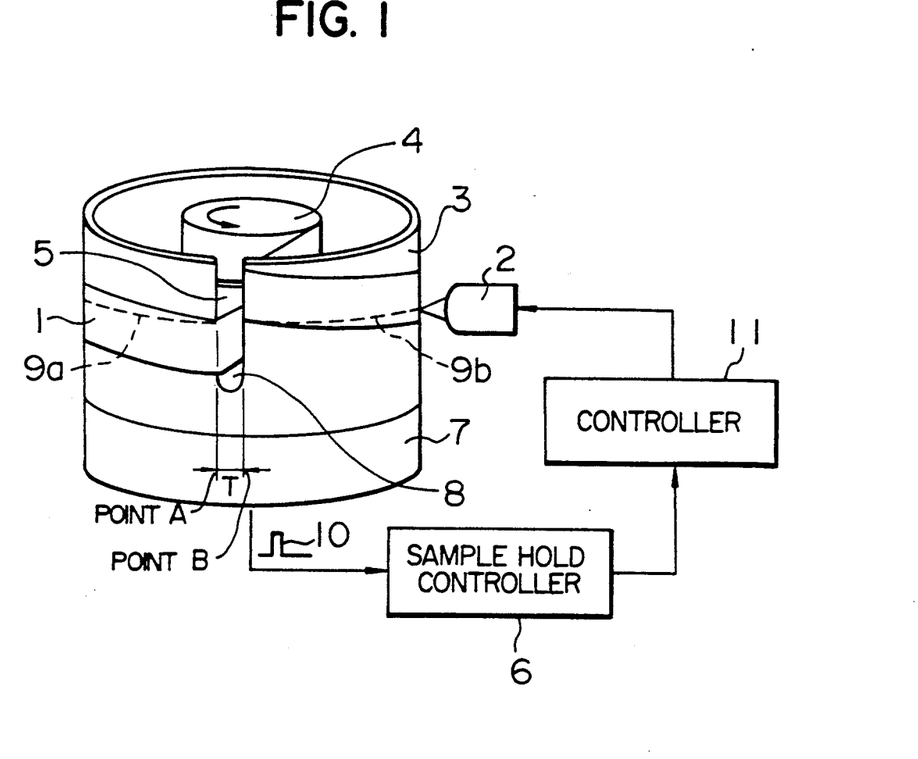
FIG. 1 is a perspective view of a drum in an optical video tape recorder showing one embodiment of the present invention.

FIG. 1 is a perspective view of a drum in an optical video tape recorder showing one embodiment of the present invention. An optical tape 1 led out from a tape feed spool 5 is helically wound round a drum 3, and then taken up by a tape take-up spool 4 through a slit 8. The tape feed spool 5 and the tape take-up spool 4 are rotated at a high seed together with the drum 3, while the optical tape 1 is fed at a constant speed by a capstan (not shown) disposed within the drum 3, for example. An optical head 2 is disposed outside the drum 3 to record or reproduce signals on a signal track 9, as indicated by a broken line, formed on the optical tape 1. Focusing is performed so that the spot focus of the optical head 2 is always positioned on the optical tape 1. Tracking is also performed so that the spot of the optical head 2 is always positioned on the signal track 9. Since focusing and tracking are explained in the foregoing U.S. Pat. Ser. No. 239,389, detailed description thereof is omitted here. During rotation of the drum 3, the signal track 9 is discontinued at a location of the slit 8, and focusing and tracking are interrupted there. In this embodiment, therefore, when the spot of the optical head 2 reaches the location of the slit 8, a sample hold controller 6 issues a command to a controller 11 so as to hold sampled signals based on an index pulse 10 generated one for each rotation through a slit (not shown) of an encoder built in a motor 7 for rotating the drum 3, for example, the controller 11 being provided to perform focusing and tracking of the optical head 2 during a period of time T corresponding to a width of the slit 8 between points A and B.

Figure 2:
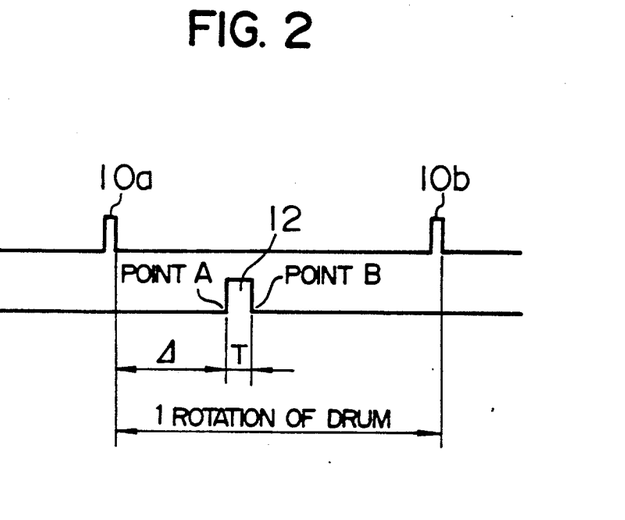
FIG. 2 is a chart for explaining operation of a sample hold circuit.

More specifically, as shown in FIG. 2, supposing that the period of time T corresponding to the discontinued region of the optical tape 1 appears after the elapse of $\Delta$ from generation of the index pulse 10, the controller 11 is instructed to position the optical tape 1, during the discontinued time T, based on both a focusing error signal and a tracking error signal detected at the point A after the elapse of $\Delta$. This allows to perform stable focusing and tracking on the imaginary optical tape 1, so that the control operation can be restarted immediately at the time when the optical tape 1 reappears for being actually detected again.

To this end, the time $\Delta$ from the location where the index pulse 10 generates to the point A at one end face of the slit 8 is measured in advance. Then, a logic is so designed that the controller generates, after the elapse of time $\Delta$, a pulse 12 with sample hold period T, and keeps the sampled hold values during the presence of the pulse 12.

Figure 3A:
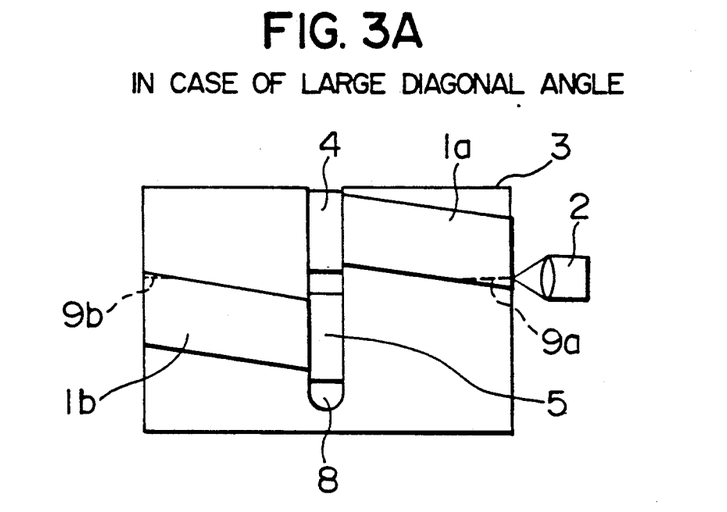
FIGS. 3A and 3B are side views of the drum for explaining a diagonal angle of an optical tape.
Figure 3B:
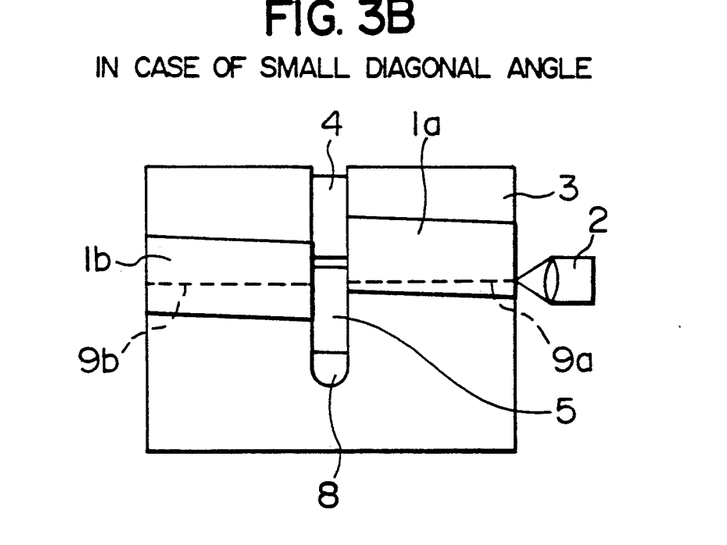

In the optical tape recorder where the tape feed and take-up spools 5, 4 are arranged one above the other within the drum 3 and the optical tape 1 is helically wound round the drum 3, the discontinued length of the signal track recorded on the tape is different dependent on a helical angle of the tape, as shown in FIGS. 3A and 3B.

When the diagonal angle is large, i.e., when the shift in position of the optical tape 1 at the slit 8 is large, the signal track 9 formed by the optical head 2 on the optical tape 1 becomes to have a discontinued portion larger than the width of the slit 8. This makes it difficult to precisely position the optical head on the target signal track by sample holding.

When the diagonal angle of the tape is small, however, the discontinued portion of the signal track 9 becomes nearly equal to the width of the slit 8, making it possible to precisely position the optical head on the target signal track by sample holding.

Figure 4A:
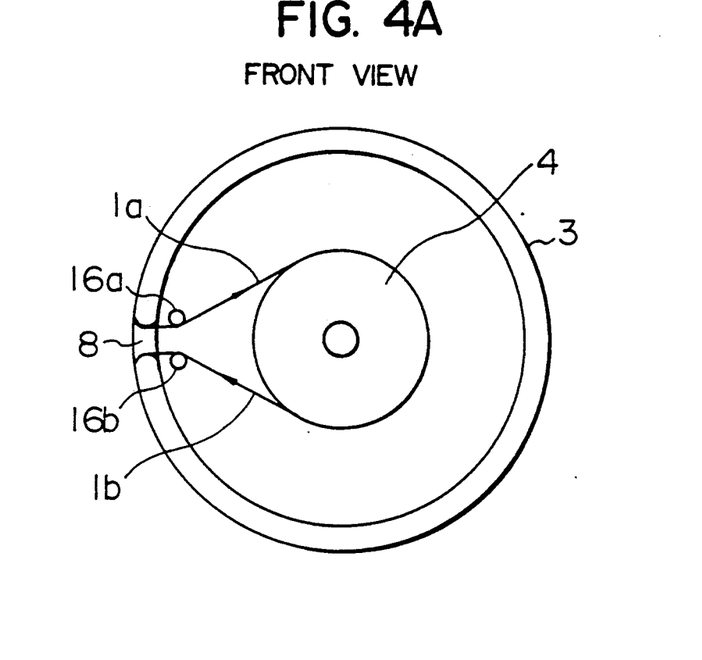
FIGS. 4A and 4B are respectively a front view and a side sectional view of a drum in the optical video tape recorder showing another embodiment of the present invention.
Figure 4B:
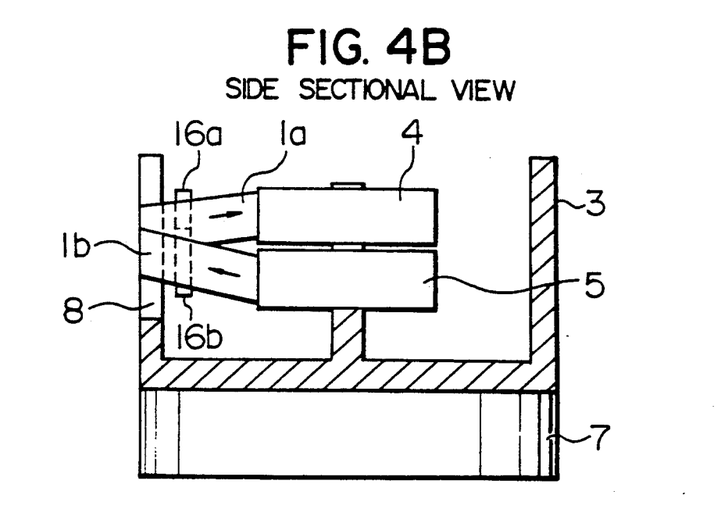

FIGS. 4A and 4B show one embodiment of the present invention in which the optical tape 1 can be helically wound round the drum 3 with the smaller diagonal angle.

The tape feed and take-up spools 5, 4 are arranged one above the other within the drum 3. The optical tape 1 is fed from the spool 5 disposed on the lower side, for example, and then positioned by a tape guide 16a so as to approach from the level of the spool 5 to that of the spool 4, followed by being helically wound round the drum 3. After running almost round the drum 3, the optical tape 1 passes through the slit 8 and positioned by a tape guide 16b so as to further approach from the level of the spool 5 to that of the spool 4, followed by being taken up by the spool 4. As a result, the diagonal angle of the tape at the slit 8 of the drum 3 can be made small as shown in FIG. 3B, and the discontinued length of the signal track 9 becomes nearly equal to the width of the slit 8, so that the optical head can be easily positioned on the target signal track 9 by sample holding.

By forming guide grooves on the tape guides 16 and the drum 3 for facilitating adjustment of the tape position, it becomes possible to position the tape with much ease and to accurately set the diagonal angle, with the result of more stable positioning of the optical head.

Figure 5:
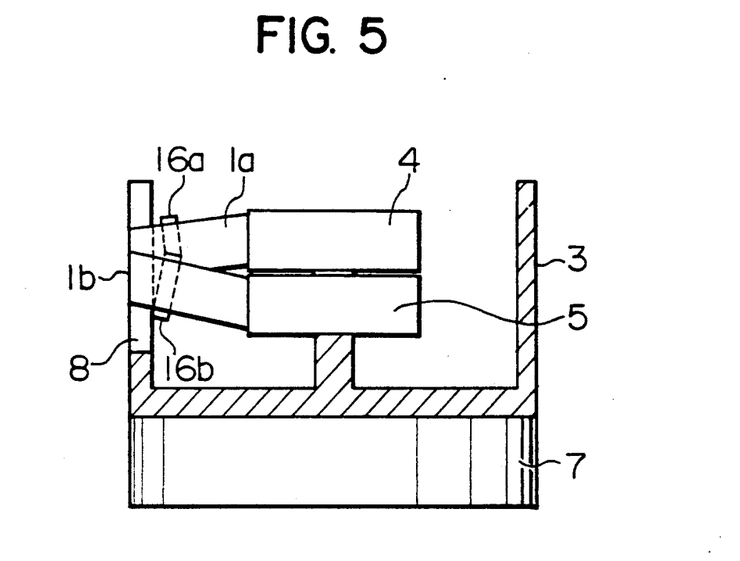
FIG. 5 is a side sectional view of a drum for explaining still another embodiment of the present invention.

As shown in FIG. 5 as one embodiment of the present invention, the tape guides 16a, 16b may be inclined by an angle subtended by the levels of the spools 4, 5 and the tape levels at the slit 8, respectively. This reduces the probability that the optical tape 1 may fold or deform, and hence further facilitate positioning of the tape.

Capstans (not shown) for feeding the tape can be used in place of the tape guides 16a, 16b. Thus, means to practice such positioning is not limited in the present invention.

The means of adjusting tape position, mounting angles thereof, the presence or absence of guide grooves, and so forth can be practiced in many ways other than the foregoing embodiment, or regarded as a matter of choice in design, so the present invention is not intended to limit practical means to embody the invention. Further, the value of diagonal angle of the tape and the size of the guide grooves may be different dependent on such parameters as the size of spools and the width of the tape. Accordingly, specific values of such parameters are not limited in the present invention.

The appropriate time interval T determined corresponding to the rotational speed of the drum 3 is required to perform sample holding. If T becomes large, sample holding would be difficult to carry out. In practicing the present invention, therefore, the width of the slit 8 is required to be smaller than a certain value dependent on the rotational speed of the drum 3. But, the present invention is not intended to limit the width of the slit 8 to a particular value. With focusing and tracking of the optical head 2 being made under sample holding, the optical head 2 can record, reproduce or erase signals while stably following the signal track 9, even if the optical tape 1 is discontinued around the drum 3 due to the presence of slit 8. Then, by irradiating condensed laser beam pulses onto a recording film of the optical tape 1 to cause changes in temperature, crystal structure of the recording film is varied to change the reflective rate of the laser beam pulses from the optical tape 1, thereby enabling to record or reproduce signals.

The optical tape 1 may have a pre-groove track (not shown) recorded thereon like optical disks. Tracking is facilitated by recording or reproducing signals based on such a pre-groove track.

Figure 6:
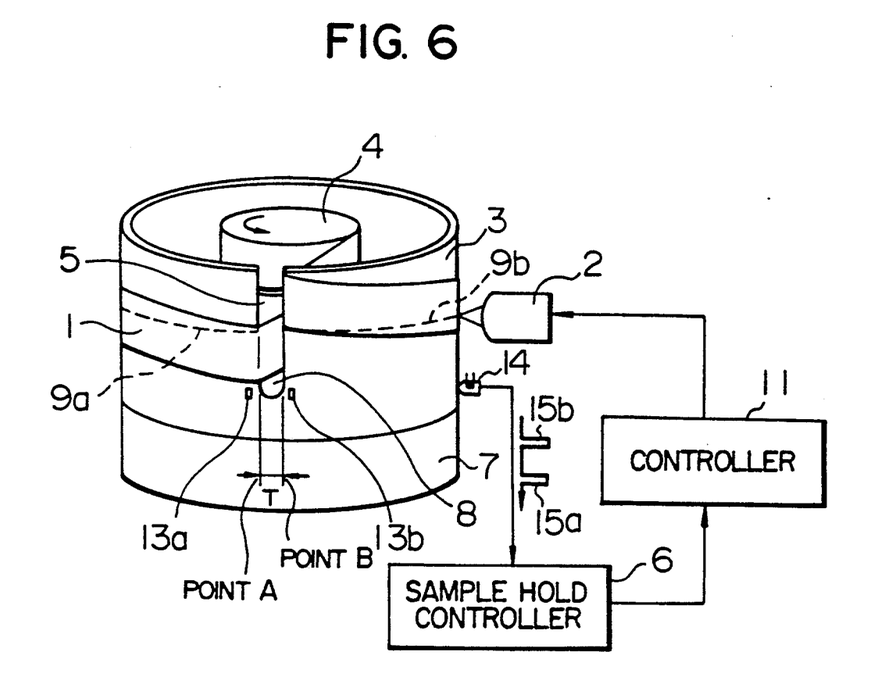
FIG. 6 is a perspective view of a drum showing still another embodiment of the present invention.

FIG. 6 is a perspective view of a drum in the optical tape video recorder showing still another embodiment of the present invention.

In this embodiment, two magnets 13 disposed near the slit 8 are detected by a magnetic head 14 disposed near the optical head 2, and a detected signal 15 is applied to a sample hold circuit 6. This case makes it easier to detect the location of the slit 8 by directly determining it.

Figure 7:
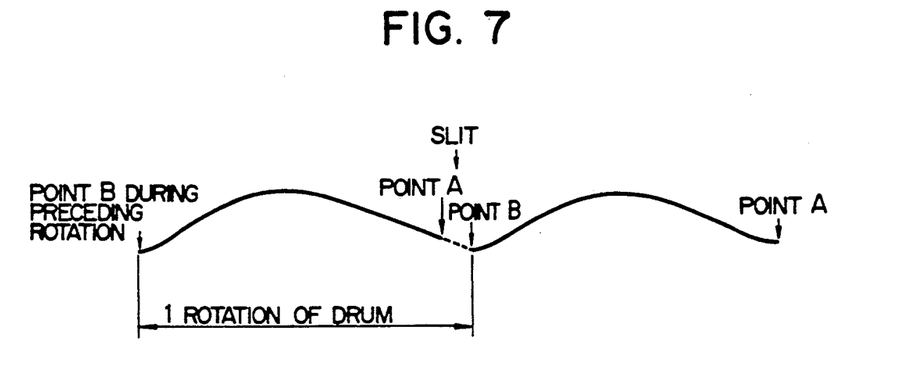
FIG. 7 is an explanatory view of a focusing error signal.

FIG. 7 is an explanatory view of a focusing error signal in the optical tape video recorder showing still another embodiment of the present invention. Because of deflection and other factors during one rotation of the drum 3, the focusing error signal is varied as shown by way of example. Since the focusing error signal disappears at the location of the slit 8, the value of the focusing error signal sampled at the point A immediately before disappearance of the focusing error signal is held, while interrupting the focusing control. The focusing control is then restarted from the point B. In this respect, by holding the value of the focusing error signal sampled at the point B during the preceding rotation and staring the focusing control using that sampled signal at the time when the current point B is reached, the system is quickly pulled into the focusing operation and control accuracy is improved correspondingly.

Figure 8A:
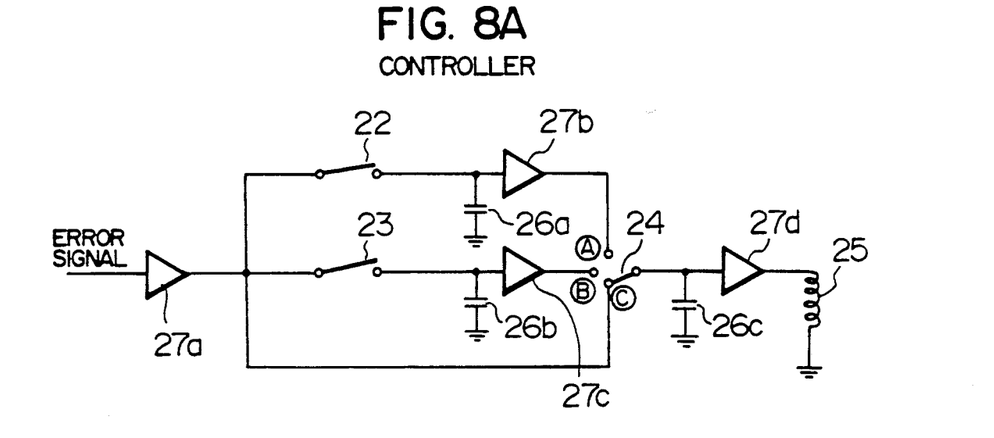
FIGS. 8A, 8B and 9A, 9B are explanatory views showing controllers and timing charts according to further embodiments of the present invention, respectively.
Figure 8B:
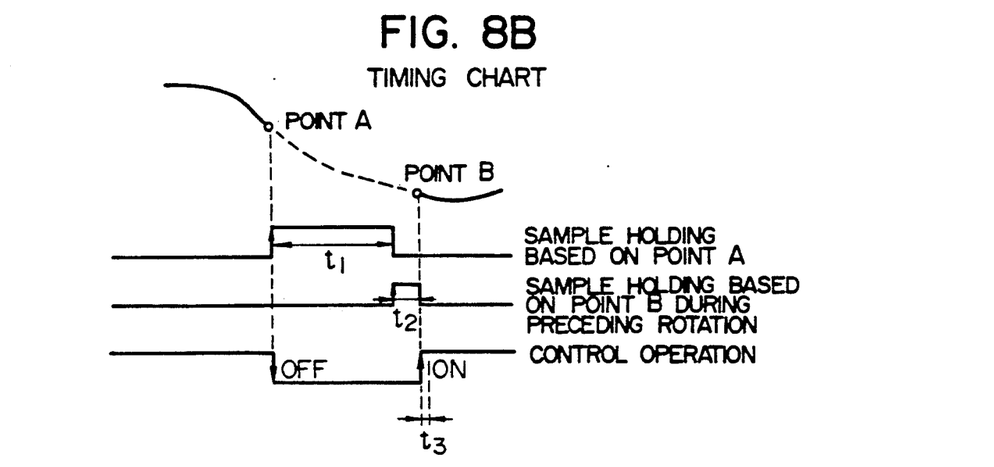

One example of the method of sample holding in that case will now be described with reference to FIG. 8.

The location of the point A where the focusing error signal disappears is determined in advance based on a pulse generated through a slit (not shown) of an encoder built in the motor for rotating the drum 3, for example. When the point A is reached, a switch 22 in the controller is turned "OFF" to hold the focusing error signal sampled at that time and another switch 24 is switched from to for thereby performing the focusing control. Thus, the focusing error signal sampled at the point A flows through a voice coil motor (VCM) 25, for example, so that the spot focus of the optical head is positioned on the imaginary optical tape irrespective of the partial absence of the optical tape from the drum. After the elapse of time t1, the switch 24 is switched from to . At this time, a switch 23 is in an "OFF" state, and the focusing error signal sampled at the location of the point B during the preceding rotation is held by a capacitor 26b as with the case of the point A. Accordingly, upon the above switching of the switch 24, the focusing error signal sampled at the point B during the preceding rotation now flows through the voice coil motor 25, allowing the position of the optical head to be controlled based thereon. When the optical tape appears again over the drum after the elapse of time t2, the switch 24 is switched from to and the switch 23 is turned "ON". The focusing error signal can now be determined using the reflective light from the optical tape, and the normal control operation is hence restarted after the elapse of time t3. To hold the focusing error signal sampled at this time, the switch 23 is turned "OFF" When the drum will reach the point A again after making a round, the above sample holding will be repeated. Control of the respective switches as mentioned above is performed by signals output from the sample hold controller 6. In this embodiment, since the spot focus of the optical head is controlled to be positioned near the point B by sample holding, the time t3 can be reduced to restart the focusing operation promptly. It is to be noted that the periods of time t1-t3 are varied dependent on the rotational speed of the drum, the length of disappeared portion of the optical tape, characteristics of the focusing controller, and so forth.

Figure 9A:
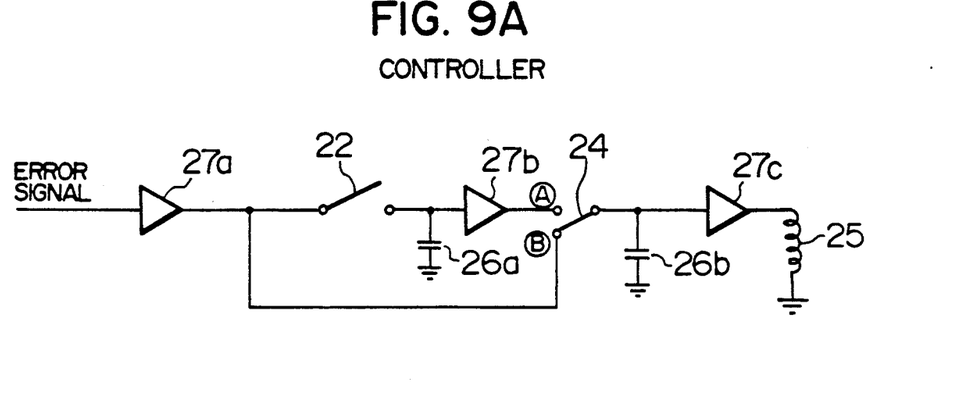
Figure 9B:
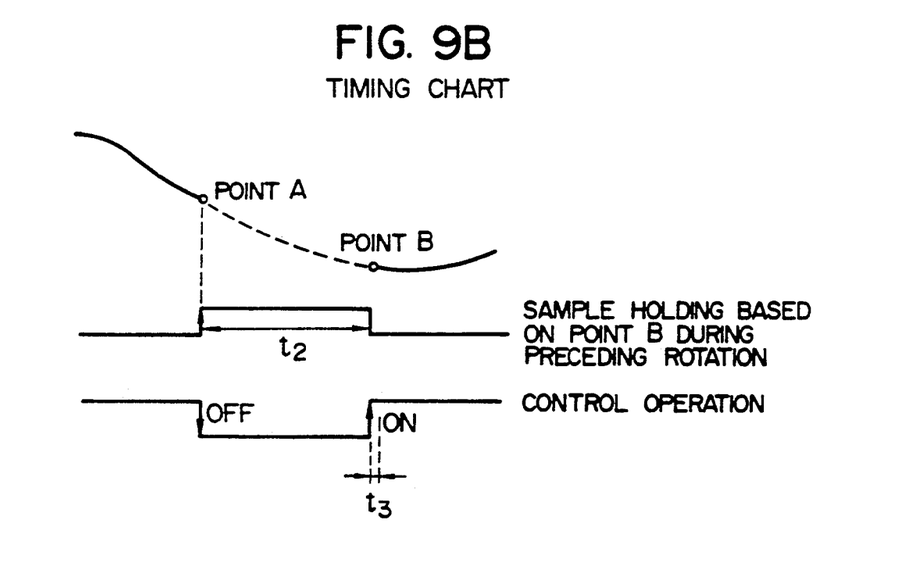

FIG. 9 is an explanatory view of the sample holding method showing still another embodiment of the present invention.

In this case, when the point A is reached, a switch 24 is switched from to to perform the focusing operation based on the focusing error signal sampled at the point B during the preceding rotation. At this time, a switch 22 is in an "OFF" state, and the focusing error signal sampled at the point B during the preceding rotation is held by a capacitor 26a. After the elapse of time t2 corresponding to the slit width T, the switch 24 is switched from to and the switch 22 is turned "ON", so that the normal control operation is restarted by the focusing controller after the elapse of time t3. To hold the focusing error signal sampled at this time, the switch 23 is turned "OFF" after the elapse of time t3. When the drum will reach the point A again after making a round, the above sample holding will be repeated.

Although the above embodiments of the present invention have been explained as holding the focusing error signal based on its values sampled at the point A during the current rotation and the point B during the preceding rotation, sample holding can be made based on the focusing error signal at any time points. This equally applies to the tracking error signal as well. Thus, the present invention is applicable to any types of sample holding for the focusing error signal and the tracking error signal without departing from the essence thereof.

Figure 10:
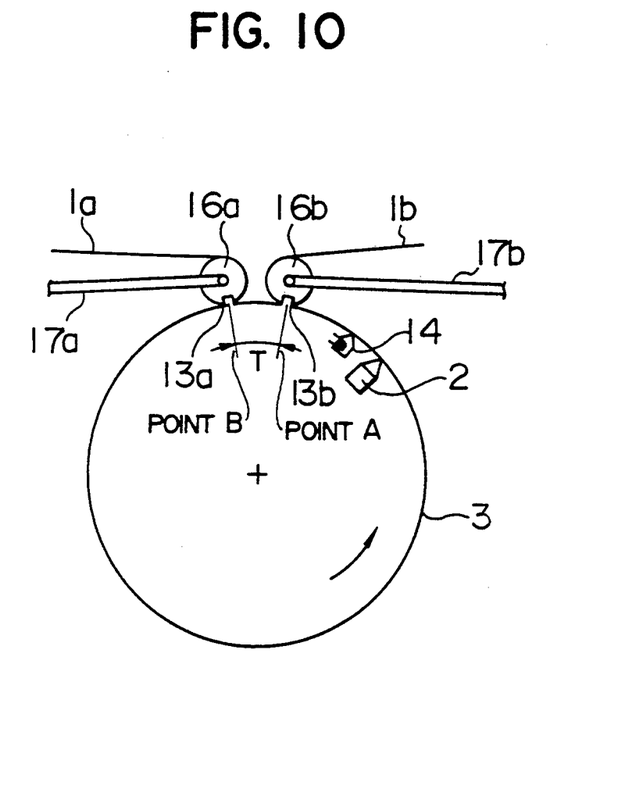
FIG. 10 is a sectional view of a drum in the optical video tape recorder showing still another embodiment of the present invention.

FIG. 10 is a sectional view of a drum in the optical video tape recorder showing still another embodiment of the present invention. In this embodiment, an integrated optical head 2 as disclosed in Japanese Patent Laid-Open No. 56-111140, for example, is assembled in the drum 3. Tape guides 16a, 16b are moved round the drum 3 by rods 17a, 17b, respectively, so that the optical tape 1 is helically wound round the drum 3. The optical head 2 is rotated together with the drum 3, and focusing and tracking of the optical head 2 are performed by sample holding during the period of time T in which the optical tape 1 is discontinued over the drum 3. In this case, since the optical head 2 is the integrated type using an optical deflector or the like which includes no mechanical movable parts such as actuators, focusing and tracking are performed stably without suffering from an adverse effect of centrifugal force caused by the rotation.

The period of time T in which the optical tape 1 is discontinued over the drum 3 can be determined by, for example, providing a magnetic head 14 just in front of the optical head 2 in the rotating direction thereof and then detecting, by the magnetic head 14, magnets 13a, 13b embedded in the tape guides 16a, 16b, respectively. The magnets 13a, 13b embedded in the tape guides 16a, 16b are arranged so as to be wider than the width of the optical tape 1 or located at those portions exposed from the upper or lower edge of the optical tape 1, while the magnetic head 14 is located at such a position as allowing to detect the magnets 13a, 13b. Since the positional relationship between the optical head 2 and the magnetic head 14 is determined in advance, the start point of the discontinued time T can be easily derived by an electric circuit. Accordingly, the magnetic head 14 is not necessarily required to locate on the same plane as the optical head 2, and may be positioned in front of the optical head 2 on the different plane from that of the optical head 2. Thus, the present invention is not intended to limit the location to detect the magnets.

In this case, too, if the period of time T in which the optical tape 1 is discontinued over the drum 3 becomes large, sample holding would be difficult to carry out. A winding angle of the optical tape 1 over the drum 3 by the tape guides 16 is therefore required to be large.

Although the above embodiment of the present invention has been explained as using the magnets 13 and the magnetic head 14 to detect the winding angle of the optical tape 1 over the drum 3 by the tape guides 16, the winding angle can also be detected using the reflective light emitted from a light source such as a light emitting diode (LED) or diode laser. In the optical tape video recorders of this case, too, the values of the error signal sampled at the point A during the current rotation and the point B during the preceding rotation can be used for making sample holding. It should be understood that the present invention is also applicable to those types of tape recorders without departing from the essence thereof.

Further, the technique of helically winding the optical tape 1 round the drum 3 and recording signals obliquely with respect to the optical tape can be practiced in other many methods than disclosed in the foregoing embodiments.

The present invention is also applicable to those other cases without departing from the essence thereof. In addition, although a single optical head is employed in the foregoing embodiments of the present invention for simplification of explanation, the present invention can also be applied to the case of using multiple optical heads. Thus, the number of optical heads is not limited.

As described above, in accordance with the present invention, the head is stably positioned onto the tap under focusing and tracking even in a region where the tape is not present over the drum, with the result that signals are stably recorded, reproduced or erased.

What is claimed is:

1. A tape recorder comprising:
   a tape wound helically over the surface of a drum, said tape being discontinuous over a portion of the surface of said drum;
   a head for recording, reproducing, or erasing signals on a signal track on said tape;
   means for generating an error signal representing one of a focusing error between said tape and said head and a tracking error between said signal tack and said head; and
   means for holding, during a period of time corresponding to the portion of the surface of said rum over which said tape is discontinuous, a value of the error signal at least at a time corresponding to a beginning of the portion of the surface of said drum over which said tape is discontinuous.

2. A tape recorder according to claim 1, further comprising:
   means for rotating said drum; and
   means for substituting, during a current rotation of said drum, a value of said error signal held by said holding means during a preceding rotation of said drum for said error signal during the period of time corresponding to the portion of the surface of said drum over which said tape is discontinuous.

3. A tape recorder according to claim 1 or 2, wherein said head is disposed in said drum.

4. A tape recorder according to claim 1, wherein said head is disposed outside said drum.

5. A tape recorder according to claim 1, further comprising a guide for guiding said tape such that levels of edges of said tape on opposite sides of the portion of the surface of said drum over which said tape is discontinuous are close to each other.

6. A tape recorder according to claim 5, wherein said guide is provided with a groove for guiding said tape.

7. A tape recorder according to claim 1, further comprising a capstan for feeding said tape such that levels of edges of said tape on opposite sides of the portion of the surface of said drum over which said tape is discontinuous are close to each other.

8. A tape recorder according to claim 6, wherein said guide for guiding said tape is inclined with respect to said tape.

9. A tape recorder according to claim 1, wherein an optical recording medium is provided on said tape and said head optically records, reproduces or erases said signals.

10. A tape recorder comprising:
a feed spool and a take-up spool for respectively unwinding and winding a tape serving as a recording medium;
a rotatable drum disposed between said feed spool and said take-up spool such that said tape is helically wound over the surface of said drum, said tape being discontinuous over a portion of the surface of said drum;
a head for recording, reproducing, or erasing signals on said tape wound over the surface of said drum; and
control means for controlling the relative positional relationship between said head and said tape based on an error signal such that said signals are stably recorded, reproduced, or erased along a desired track on said tape, said control means including means for holding a value of said error signal during a period of time corresponding to the portion of the surface of said drum over which said tape is discontinuous.

11. A tape recorder according to claim 10, wherein said holding means includes first holding means for holding a value of said error signal at a time corresponding to a beginning of the portion of the surface of said drum over which said tape is discontinuous.

12. A tape recorder according to claim 10, wherein said holding means includes means for holding a value of said error signal at a time corresponding to an end o the portion of the surface of said drum over which said tape is discontinuous.

13. A tape recorder according to claim 11, wherein said holding means further includes second holding means for holding a value of said error signal at a time corresponding to an end of the portion of the surface of said drum over which said tape is discontinuous, and means for successively selecting an output of said first holding means and an output of said second holding means during the period of time corresponding to the portion of the surface of said drum over which said tap ie discontinuous.

14. A tape recorder according to claim 10, further comprising detection means for detecting the portion of the surface of said drum over which said tap ie discontinuous, said holding means being controlled based on n output of said detection means.

15. A tape recorder according to claim 14, wherein an encoder provided in a motor for rotating said rotatable drum is used as said detection means.

16. A tape recorder according to claim 14, wherein magnets provided in said rotatable drum and a magnetic head for detecting said magnets are used as said detection means.

17. A tape recorder according to claim 10, further comprising guide means for guiding said tape such that levels of edges of said tape on opposite sides of the portion of the surface of said drum over which said tape is discontinuous are close to each other.

18. A tape recorder comprising:
a feed spool and a take-up for respectively unwinding and winding a tape serving as a recording medium;
a rotatable drum housing therein said feed spool and said take-up spool in a rotatable manner such that said tape is helically wound over the surface of said drum through a slit in said drum, said tape being discontinuous over a portion of the surface of said drum due to the presence of said slit;
a head for recording, reproducing, or erasing signals on said tape wound over said drum surface; and
control means for controlling the relative positional relationship between said head and said tape based on an error signal such that said signals are stably recorded, reproduced, or erased along a desired track on said tape, said control means including means for holding a value of said error signal during a period of time corresponding to the portion of the surface of said drum over which said tape is discontinuous.

19. A tape recorder according to claim 18, wherein said tape is an optical recording medium, and said head irradiates a light beam onto said tape for optically recording, reproducing, or erasing said signals.

20. A tape recorder according to claim 19, wherein said control means performs focusing to control the focus of said light beam and tracking to control the irradiated position of said light beam.

* * * * *